Feb. 3, 1959   R. W. WELCH   2,871,610
FISH LURE
Filed May 24, 1957
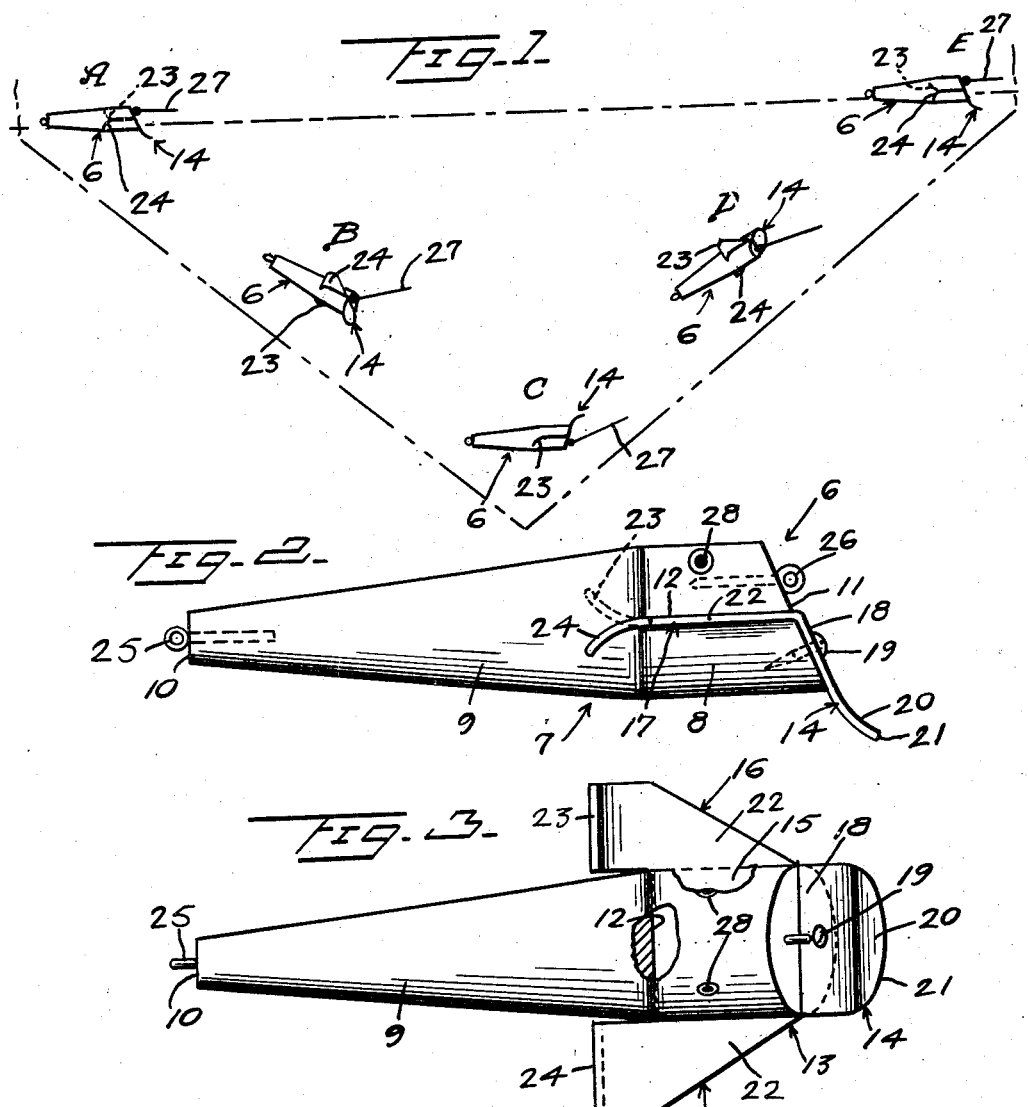
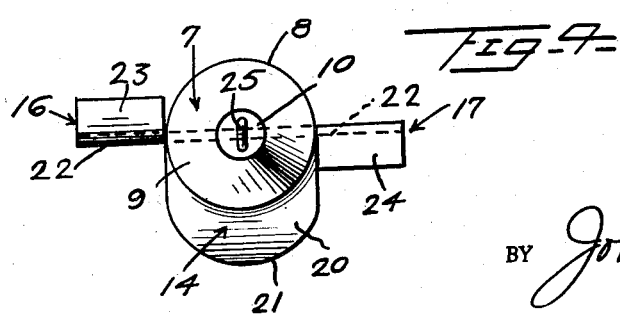
INVENTOR
R.W.Welch
BY John N. Randolph
ATTORNEY

United States Patent Office 2,871,610
Patented Feb. 3, 1959

2,871,610

FISH LURE

Richard W. Welch, Decatur, Ill.

Application May 24, 1957, Serial No. 661,367

4 Claims. (Cl. 43—42.46)

This invention relates to a novel fish lure and more particularly to a fish lure which is so constructed that it will follow a spiral course when drawn through the water so that the lure will have a combined up and down or undulating movement as well as a lateral or zigzag movement, which will very realistically simulate a swimming action of a minnow or other bait fish attempting to escape from a larger fish.

More particularly, it is an aim of the present invention to provide a fish lure of simple construction having appendages which uniquely cooperate with one another to cause the fish lure to revolve about its longitudinal axis while being drawn through the water and which rotation of the lure causes one of the appendages to assume various positions whereby the lure is caused to travel in a spiral path so that it has a combined up and down and laterally zigzag movement.

More particularly, it is an aim of the present invention to provide a fish lure having appendages for causing the lure to revolve about its longitudinal axis when drawn through the water to cause another part of the lure to assume different positions with respect to the general direction of travel of the lure and to act as a deflector for causing the lure to move in a combined undulating and zigzag course or pattern as the position of said deflector part changes relative to the axis of the lure.

Various other objects and advantages of the invention will hereinafter become more fully apparent from the following description of the drawing, illustrating a presently preferred embodiment thereof, and wherein:

Figure 1 is a diagrammatic view in side elevation illustrating a complete sequence of movement of the lure in its spiral course;

Figure 2 is an enlarged side elevational view of the lure in a normal position thereof;

Figure 3 is a top plan view, partly broken away, of the lure, and

Figure 4 is a rear end elevational view of the lure, looking from left to right of Figures 2 and 3.

Referring more specifically to the drawing, the lure, designated generally 6, is in the form of a plug and includes a body, designated generally 7, which is preferably cylindrical in cross section and which includes a head 8 and an elongated tapered tail 9, which is of a length substantially greater than the length of the head 8 and which tapers from the head 8 to the trailing end 10 of the tail 9. The head 8 has a downwardly and forwardly inclined or sloping front end or face 11 and is otherwise of uniform diameter. The head 8 is provided with a substantially diametrical slot 12 which is disposed in substantially a horizontal plane, when the lure 6 is disposed in a normal position as seen in Figure 2 with the axis of the body 7 in substantially a horizontal plane. The slot 12 opens through the face 11, substantially midway between the upper and lower ends of said face.

The lure 6 also includes a plate, designated generally 13, including a front portion 14, a rear portion 15 and side portions 16 and 17. The rear portion 15 is sized to fit snugly in the slot 12 and is of a size corresponding to the size of said slot. The front portion 14 defines a downwardly inclined extension of the rear portion 15 and includes an upper or inner part 18 which is disposed flush against the lower portion of the face 11. A driven fastening, such as a small screw 19, extends through the plate portion 18 and is anchored in the head 8 for securing the plate 13 immovably to the body 7. The lower part 20 of the front plate portion 14 forms a blade which has a rounded outer or forward edge 21. The blade extends downwardly and forwardly from the lower end of the face 11 and is forwardly curved, as best seen in Figure 2.

The side portions or wings 16 and 17 are disposed outwardly with respect to the sides of the head 8 and each includes a substantially flat forwardly tapered front portion 22. Said front portions 22 are disposed on either side of the rear central plate portion 15 and on either side of the slot 12. The wings 16 and 17 also include trailing rear end portions 23 and 24, respectively, which extend rearwardly from said flat front portions 22, and which are disposed rearwardly with respect to the slot 12 and plate portion 15. When the lure 6 is in its normal position of Figure 2 the trailing wing portion 24, located on the near side of the lure body 7, is curved downwardly and the other trailing wing portion 23, disposed on the far side of the lure body, is curved upwardly, as best seen in full and dotted lines in Figure 2.

A fishhook attaching eye 25 is anchored axially in the tail 9 and projects from the trailing end 10 thereof. A line or leader anchoring eye 26 is anchored in the upper portion of the head 8, longitudinally of the lure body 7 and projects from the upper portion of the face 11, and an end of a line or leader 27 is attached to said eye 26, as seen in Figure 1. The upper part of the head 8, on either side of the top central portion thereof and behind the upper portion of the face 11, is provided with a simulated eye 28 which may be formed in any suitable manner.

Referring to Figure 1, assuming that the lure 6 is disposed in the water at the position A with its axis in a substantially horizontal plane and with the lure facing to the right and with the eye 26 disposed above the forward plate portion 14, which constitutes a normal position corresponding to the position of Figure 2, when a pull is exerted on the lure 6 by the line or leader 27 from left to right of Figure 1, the downwardly and forwardly extending plate portion or blade 14 will cause the lure to dive or nose down. At the same time, the downwardly curved trailing wing tip 24 and the upwardly curved trailing wing tip 23 will cause the lure to turn about its axis in a counterclockwise direction as viewed from left to right or from the tail toward the head of the lure. Thus, as the lure 6 moves from its position A downwardly to its position B it will also have turned counterclockwise through an arc of somewhat less than 90°, so that the blade 14 will be offset to the right of the axis of the lure, looking from rear to front thereof, to cause the lure to be deflected laterally to the right, relative to its direction of travel. During further movement of the lure 6 from its position B to its position C, the lure will continue to dive or descend and continue to revolve counterclockwise until it has assumed an inverted position with respect to its position A. When the lure is inverted as seen at its position C, the then upwardly and forwardly extending blade 14 will cause an upward deflection of the head 8 so that the axis of the lure 6 will again be substantially horizontal. Also, in moving from position B to position C the lure will have continued to move laterally to the right. In thereafter moving from position C to position D, the lure 6 will continue to revolve counterclockwise about its axis and blade 14 which then extends upwardly and forwardly will deflect the lure upwardly to cause it to ascend, and as the blade 14 moves to a position to the left of the axis of the lure, looking from rear to front thereof, said blade 14 will also deflect the lure to the left. Thereafter during movement of the lure from its position D to its position E, the lure will continue to rotate counterclockwise about its axis, will continue to ascend, and will continue to be deflected to the left until it reaches its position E at which time the lure will be in the same position with respect to the parts thereof as it was at its initial position A and will have travelled a distance from left to right. From the position E, the lure will repeat the aforedescribed movements since the parts of the lure are disposed in the same position with respect to the axis thereof at position E as they were at position A.

The length of travel of the lure between its positions A and E and the depth to which the lure will descend from the level of positions A and E to position C, will vary depending upon the rate of speed at which the lure is trolled or retrieved.

The lure body 7 may be formed of a buoyant material in which case the lure will constitute a surface lure and in its at rest position A will be on the surface of the water and will return to the surface at its position E, each time that it completes a complete spiral in its undulating and zigzag travel. Also, the body 7 may be weighted or nonbuoyant so that the lure 6 will constitute an underwater or subsurface lure, in which case the spiral course followed by the lure will be completely below the surface of the water. By varying the weight of the body 7 and the speed at which the lure is trolled or retrieved, said lure can be caused to operate as either a shallow or deep running lure.

It will thus be seen that the trailing wing tip appendages 23 and 24 function to cause the lure to revolve about its longitudinal axis to thus effect a rotational movement of the blade 14 by means of which the lure is caused to dive, ascend and zigzag in a spiral course of movement due to the blade 14 assuming positions below, above, to the right and to the left of the axis of the lure body.

Various modifications and changes are contemplated and may be resorted to, without departing from the function or scope of the invention as hereinafter defined by the appended claims.

I claim as my invention:

1. A fish lure comprising an elongated lure body having a forward part constituting a head, said head having a forward end defining a face, a blade secured to said head and disposed against and extending downwardly and forwardly from the face, wing members secured to said head and extending outwardly from the sides thereof, one of said wing members having a downwardly curved trailing end and the other wing member having an upwardly curved trailing end to cause said lure to revolve about its longitudinal axis when drawn through the water in a forward direction and to cause the blade to revolve about the axis of the lure whereby the forward end of the lure will be deflected downwardly and upwardly and to the right and to the left to travel in a spiral path, and means for attaching a line to the lure, said means projecting from the face above and behind the blade.

2. A fish lure as in claim 1, said blade and wing members constituting a part of a plate, said plate having a rear central portion disposed behind the blade and between corresponding portions of said wing members, said head having a diametrically extending slot opening outwardly of the sides thereof and through said face in which said central rear portion of the plate is disposed.

3. A fish lure comprising an elongated lure body, appendages projecting laterally from and secured to the lure body and including means for causing said body to revolve about its longitudinal axis when drawn through the water, and a blade fastened to and extending at an incline from the forward end of the lure body for causing said forward end of the lure body to be deflected in a direction corresponding to the direction in which the blade extends away from the axis of the lure body, whereby said blade will successively deflect the forward end of the lure body downwardly, laterally in one direction, upwardly and then laterally in the other direction as the lure body is propelled forwardly and revolved about its longitudinal axis to cause the lure to follow a spiral path, said appendages being spaced apart a distance not less than the width of the blade and the width of the portion of the lure body disposed between the appendages.

4. A fish lure as in claim 3, said appendages comprising wing members disposed longitudinally of the lure body, said means comprising curved trailing end portions of the wing members, one of said trailing end portions being curved downwardly and the other trailing end portion being curved upwardly when said wing members are disposed in substantially a horizontal plane.

References Cited in the file of this patent

UNITED STATES PATENTS

| | | |
|---|---|---|
| D. 149,790 | Biernat | June 1, 1948 |
| D. 161,820 | Brooks | Feb. 6, 1951 |
| 1,575,139 | Wiesenfeld | Mar. 2, 1926 |
| 1,700,061 | Kimmich | Jan. 22, 1929 |
| 1,948,005 | Pflueger | Feb. 20, 1934 |
| 2,245,061 | Wisniewski | June 10, 1941 |